April 26, 1966   J. A. MARLAND   3,247,935
ONE-WAY BRAKE ASSEMBLY AND SEAL MEANS THEREFOR
Filed July 20, 1964   2 Sheets-Sheet 2
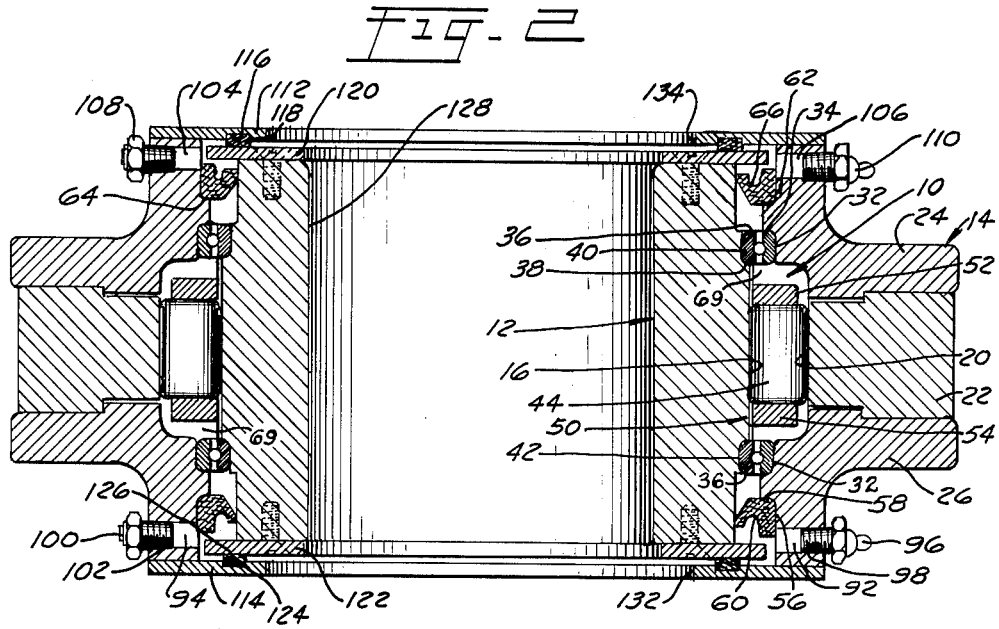
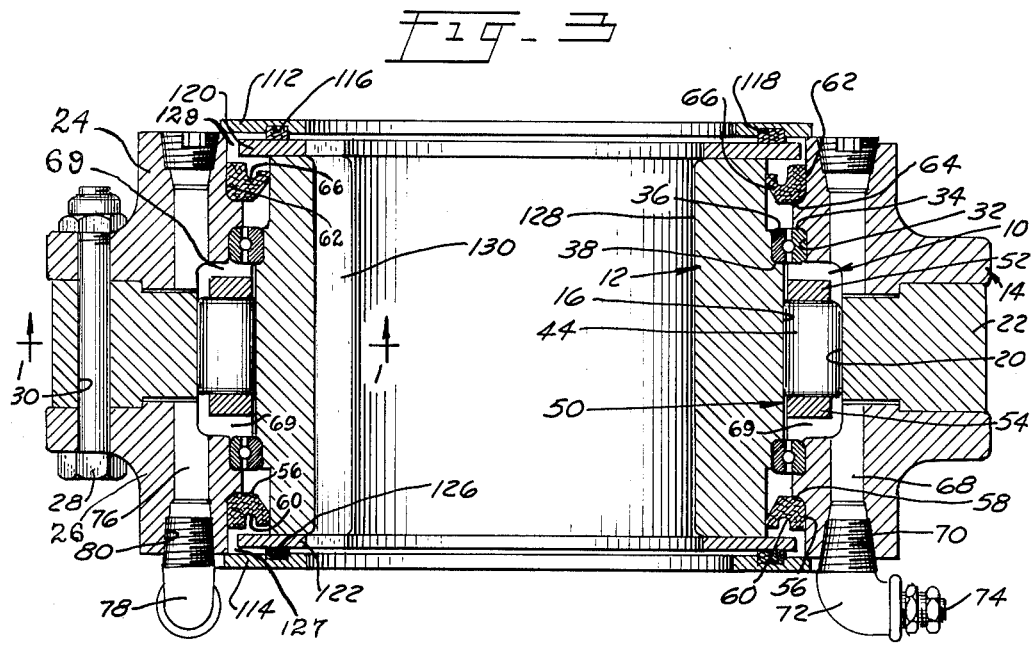
INVENTOR.
JOSEPH A. MARLAND
BY
Stone, Neuman, Burmeister
& Zimmer
ATTORNEY United States Patent Office 3,247,935
Patented Apr. 26, 1966

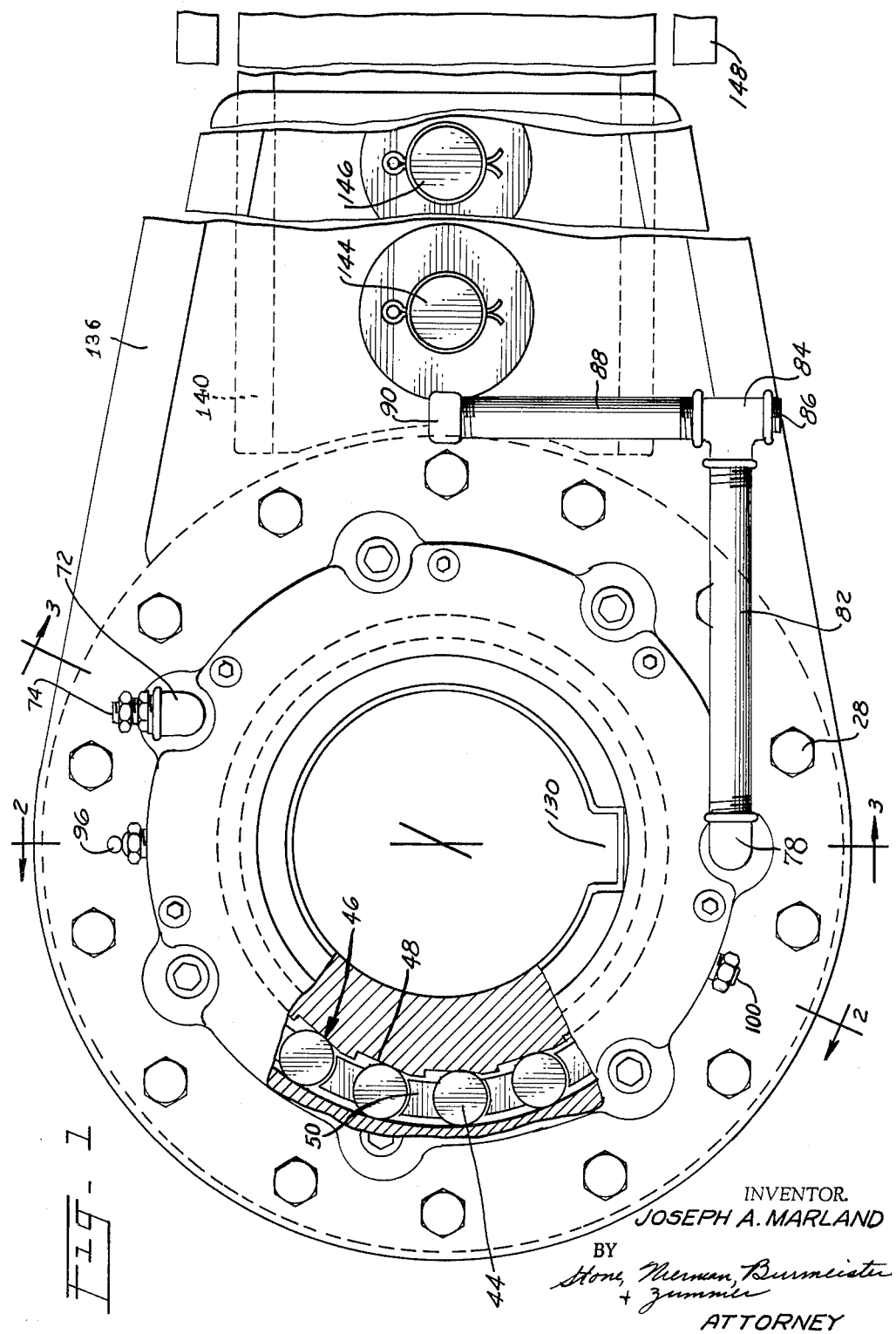

3,247,935
ONE-WAY BRAKE ASSEMBLY AND SEAL MEANS THEREFOR
Joseph A. Marland, 210 Blackstone, La Grange, Ill.
Filed July 20, 1964, Ser. No. 383,626
10 Claims. (Cl. 188—264)

The present invention relates generally to one-way brakes and to lubricating systems therefor. In particular, the present invention relates to lubricated one-way back stops.

Patent No. 2,865,474 of the present inventor entitled, "One-Way Automatic Backstops," sets forth a backstop for permitting rotation of a shaft in only one direction which utilizes a one-way brake of the roller type. The rollers of the brake are lubricated by a body of liquid lubricant disposed between the inner and outer races of the brake, and seals are disposed between the inner and outer races to maintain the lubricant between the races and to prevent dirt and dust from working into the region between the races from the exterior of the brake. The present invention is an improvement on the one-way brake shown in Patent No. 2,865,474.

One-way brakes are operated in most applications in the presence of dirt, grime, and dust. Dirt, grime, and dust tend to seep through the seals between the inner and outer race and contaminate the liquid lubricant disposed therein. Moisture also penetrates between the inner and outer race of a one-way brake and combines with the dirt, grime, and dust to form a sludge which is injurious to the rollers of the one-way brake and to the surfaces upon which the rollers operate. The one-way brake of Patent No. 2,865,474 relies upon a felt washer to exclude dirt, grime, and dust, and this has been found to be satisfactory only under relatively clean operating conditions. It is an object of the present invention to provide a one-way brake particularly suitable for use in backstops which may be utilized under conditions of constant rotation between the races thereof and environments containing substantial dirt, grime, and dust. One-way brakes have been known prior to the present invention which effectively solved the problem of operation under adverse conditions of dirt, grime, and dust. For example, the patent application of the present inventor, Serial No. 281,217 entitled, "One-Way Backstop" filed May 17, 1963, discloses a one-way backstop in which a one-way brake is totally enclosed within an essentially sealed housing. This construction requires bearings between a shaft carried by the inner race of the brake and the housing containing the brake and necessitates the alignment of these bearings with the shaft of the load. It is a further object of the present invention to provide a one-way backstop which may be directly mounted on the shaft of the load and which is provided with improved means for excluding dirt, grime, and dust from the interior of the one-way brake of the backstop.

These and further objects of the present invention will be more fully appreciated and understood from a further consideration of this specification, particularly when viewed in the light of the drawings, in which:

FIGURE 1 is a front elevational view of a one-way backstop constructed according to the teachings of the present invention, a portion of the figure being broken away to illustrate a fragment of the one-way brake along the line 1—1 of FIGURE 3;

FIGURE 2 is a sectional view taken along the line 2—2 of FIGURE 1; and

FIGURE 3 is a sectional view taken along the line 3—3 of FIGURE 1.

The one-way brake of the backstop illustrated in the figures is generally designated 10 and has an inner member 12 and an outer member 14. The inner member 12 has a generally cylindrical ratchetted exterior surface forming an inner cam 16 of the one-way brake 10. The outer member 14 has a cylindrical opening 20 for accommodating the inner member 12, and the opening 20 forms an outer race coaxially disposed about the inner race 16 and spaced therefrom.

The outer member 14 is formed by a central ring 22 which carries the outer race 20 and two cover plates 24 and 26 which are disposed at opposite sides of the central ring 22. The cover plates 24 and 26 and central ring 22 are held together in a single assembly by a plurality of bolts 28 which extend through channels 30 in the central ring 22 and cover plates 24 and 26.

Each of the cover plates 24 and 26 is provided with a circular recess 32 with a shoulder 34 on the side of the recess remote from the central ring 22. The inner member 12 is also provided with a recess 36 confronting each recess 32, and the recesses 36 are provided with shoulders 38 adjacent to the inner cam 16. A pair of ball bearing assemblies 40 and 42 are mounted in the recesses 36 of the inner member 12 and engage the recesses 32 of the outer member 14 to rotatably mount the outer member 14 coaxially about the inner member 12. The ball bearing assemblies 40 and 42 are secured in position axially by the shoulders 38 of the inner member 12 and the shoulders 34 of the outer member 14.

The one-way brake illustrated in the figures utilizes a plurality of rollers disposed between the inner cam 16 and the outer race 20, although it is to be understood that other types of drive elements such as sprags may also be used with the present invention. However, the present invention is particularly applicable to rollers and, since rollers continuously rotate in the free wheeling condition, an adequate supply of liquid lubricant is essential to the life of a roller brake. The rollers 44 are disposed within indentations 46 in the inner cam 16. The indentations 46 are provided with flat surfaces 48 disposed parallel to the axis of the inner cam 16 and at the same angle to the tangent of the inner cam at the intersection of the flat surface 48 and the surface of the inner cam 16. The rollers 44 are disposed in a cage 50 which includes a pair of rings 52 and 54 coaxially disposed about the inner cam 16 at opposite ends of the rollers 44.

The cover plate 26 is also provided with an indentation 56 between the shoulder for the ball bearing assembly 42 and the end thereof remote from the cage 50, and the indentation forms a shoulder 58. A circular lip seal 60 is disposed in the indentation 56 abutting the shoulder 58, and the lip of the seal 60 abuts the exterior surface of the inner member 12 to form a fluid tight seal therewith. In like manner, the cover plate 24 is provided with a circular indentation 62 which extends coaxially about the inner surface thereof and has a circular shoulder 64 confronting the ball bearing assembly 40. A circular lip seal 66 is disposed in the indentation 62 and has a circular lip which abuts the exterior surface of the inner member 12 and forms a fluid tight seal therewith. The circular lip seals 60 and 66 are preferably constructed of rubber or neoprene.

A channel 68 extends through the cover plate 26 to communicate with the circular cavity designated 69 and disposed between the seals 60 and 66 and between the inner member 12 and outer member 14. The end of the channel 68 remote from the cavity terminates in a threaded mouth 70, and an elbow 72 carrying a pressure relief valve 74 is sealed within the mouth 70. The mouth 70 is intended to be disposed well above the center of the outer member 14 and is for the purpose of permitting the escape of air from within the outer race as the one-way brake heats due to friction when operated. A second channel 76 also extends through the cover plate 26 to communicate with the cavity 69 formed between the seals 60 and 66 and between the inner member 12 and the outer member 14, and this channel 76 is disposed at approximately the lowest point of this cavity, that is, directly under the central axis of the races, as indicated in FIGURE 3. An elbow 78 is sealed within a threaded mouth 80 of the channel 76, and an essentially horizontally disposed pipe 82 (FIGURE 1) is threadedly sealed within the elbow 78. The end of the pipe remote from the elbow 78 is sealed in a T connection 84 which has a plug 86 at its lower end and upwardly extending riser 88 at its upper end. A cap 90 is disposed at the end of the riser 88 and sealed thereto. In lubricating the one-way brake assembly 10, the cap 90 is removed, and a liquid lubricant poured down the riser 88 to enter the cavity. The body of liquid lubricant within the one-way brake fills the portion of the cavity below the horizontal plane passing through the axis of the races. The cap 90 is thereupon replaced. The pressure relief valve 74 is generally removed for filling to permit the liquid lubricant to be rapidly poured into the cavity, and the pressure relief valve is thereupon reinserted.

As indicated in FIGURE 2, the cover plate 26 is also provided with two additional channels 92 and 94 which extend therein along radii of the outer member 14. The channel 92 is disposed on the upper surface of the cover plate 26, that is, directly above the axis of the races, and the channel 94 is disposed generally on the opposite side of the cover plate 26, as indicated in FIGURE 2. A grease nipple, or grease gun fitting, 96 is threaded into the mouth 98 of the channel 92, and a grease pressure relief fitting 100 is threadedly sealed into the mouth 102 of the channel 94.

In like manner, the cover plate 24 is provided with radial channels 104 and 106. The channel 104 is disposed below the axes of the races adjacent to the outer end of the cover plate 24 and is provided with a pressure relief grease fitting 108 sealed therein. The channel 106 is located directly above the axes of the races, and a grease gun fitting 110 is sealed therein.

The cover plates 24 and 26 are provided with axially extending lips at their ends remote from the central ring 22 of the outer member 14, these lips being in the form of flat circular plates 112 and 114 which are mounted coaxially with the inner member 12 and outer member 14. The plate 112 is provided with a groove 116 which extends coaxially about the axes of the races and has a rectangular cross section. A circular packing with a mating cross section is disposed within the groove 116 and extends outwardly from the groove toward the end of the inner member 12. The inner member 12 is provided with a flat plate 120 which is circular and mounted on the end of the inner member 12 coaxially with the axis thereof, and the plate 120 abuts the circular gasket 118 and forms a circular seal therewith. The gasket 118 is preferably an asbestos packing impregnated with graphite to provide a dirt and dust resisting seal which facilitates rotation of the plate 112 relative to the plate 120.

In like manner, the end of the inner member 12 opposite the plate 120 is provided with a circular plate 122 which confronts the plate 114. The plate 114 has a circular groove 124 coaxial with the inner member 12 and provided with a rectangular cross section, and a circular packing 126 with a mating cross section is disposed within the groove 124 and protrudes therefrom to abut the surface of the plate 122. A second lubricant with a viscosity greater than that of the first lubricant which is disposed in a cavity between the lip seals 60 and 66 is disposed in the circular cavity designated 127 and formed between the lip seal 60 and the circular packing 126. The some more viscous lubricant is disposed in the circular cavity designated 129 and formed between the lip seal 66 and the circular packing 118. This more viscous lubricant is preferably a grease and is introduced into these two cavities through the grease gun fittings 96 and 110, and air within the cavities exiting through the grease relief valves 100 and 108. The entire circular cavities between the lip seals 60 and 66 and the packings 126 and 118, respectively, are filled with this viscous lubricant or grease. In the figures, the lubricant has been omitted from the cavities 69, 127 and 129 for clarity.

The inner member 12 is provided with a cylindrical opening 128 which extends through the plates 120 and 122 affixed at the opposite ends of the inner member 12. The inner member is also provided with a key channel 130. The outer plates 112 and 114 are provided with apertures 132 and 134, respectively, of larger diameter than the opening 128 so that a shaft may be inserted within the opening 128 and the inner member 12 and keyed thereto for rotation. It is this shaft that forms the load for the one-way brake or backstop.

The two cover plates 24 and 26 are provided with integral outwardly extending arms 136 and an I-beam 140 is keyed thereto by a pair of shear pins 144 and 146. The I-beam 140 extends horizontally, as indicated in FIGURE 1, to an anchoring seat 148.

The I-beam 140 maintains the outer member 14 of the one-way brake 10 stationary and properly oriented for the lubricant of lesser viscosity which is disposed within the cavity formed between the lip seals 60 and 66. As illustrated, the I-beam 140 extends from one side of the outer member 14, but it is to be understood that the I-beam may be vertically oriented or oriented in any other angular position relative to the outer race as long as the pressure release valve 74 is positioned substantially above the axes of the races 16 and 20 and the channel 76 is disposed near the lowest portion of the cavity formed between the lip seals 60 and 66.

When the one-way backstop is operating in an environment of dirt, grit, dust, and moisture, the packing rings 118 and 126 will substantially impede the entrance of dirt, grit, dust, and moisture into the interior of the one-way brake 10. Of these undesirable contaminants which do penetrate the packings 118 and 126, the vast majority of the contaminants will be collected in the barrier formed by the viscous lubricant or grease disposed between the packings 118 and 126 and the lip seals 60 and 66, respectively. The liquid lubricant in contact with the rollers 44 of the one-way brake will thus be maintained substantially clean and capable of performing its lubrication function. Periodically the one-way backstop should be serviced by opening the plug 86 and draining the liquid lubricant from the cavity between the lip seals 60 and 66, and refilling this cavity to the desired level with clean liquid lubricant of desired lighter viscosity. The circular cavities between the lip seal 60 and packing 126 and the lip seal 66 and the packing 118 are also cleaned at the same time by inserting grease under pressure into these cavities through the fittings 96 and 110, thereby causing the old grease to exit through the relief valves 100 and 108. It is to be noted that the lip seals 60 and 66 are forced tighter against the inner member 16 as a result of pressure of the grease in the cavities communicating with the grease fittings 96 and 110, and all of the contaminated grease should be removed from the unit in this manner.

Those skilled in the art will readily devise many modifications of the present invention. Further, the present invention will readily be applied to applications in addition to these here set forth. It is therefore intended that the scope of the present invention be not limited by the foregoing specification, but rather only by the appended claims.

The invention claimed is:

1. A one-way brake assembly comprising an inner member having a generally cylindrical surface forming an inner race and having ends disposed normal to the axis of the race, said inner member being adapted to be mechanically coupled to a shaft disposed on the axis thereof, and an outer member having a cylindrical opening therein forming an outer race, means for rotatably mounting the outer member coaxially about the inner member with the outer race confronting and spaced from the inner race, a plurality of drive elements disposed between the inner race and the outer race, rotational torque applied between the inner and outer members in one direction wedging the drive elements between the races and torque in the other direction releasing the drive elements to permit rotation of the inner and outer members relative to each other, said outer member having an axial length greater than the inner member and a first lip on one end thereof extending about the opening therein and a second lip on the opposite end thereof extending about the opening therein, each of said lips confronting one end of the inner member, a first and second sealing ring disposed coaxially with the races at opposite ends of the inner member, the first of said sealing rings being disposed between the first of the lips and the confronting end of the inner member to form a fluid tight seal, and the second of said sealing rings being disposed between the second of the lips and the confronting end of the inner member to form a fluid tight seal, a third and a fourth sealing ring disposed coaxially about the inner member on opposite sides of the drive elements, said third sealing ring forming a fluid tight seal between the first lip of the outer member and the drive elements, and the fourth sealing ring forming a fluid tight seal between the second lip of the outer member and the drive elements, means for introducing a first lubricant between the third and the fourth sealing rings, means for introducing a second and more viscous lubricant between the first lip of the outer member and the third sealing ring, and means for introducing said second lubricant between the second lip of the outer member and the fourth sealing ring.

2. A one-way brake assembly comprising the combination of claim 1 wherein one of the members is provided with indentations confronting the other member, the indentations having flat surfaces parallel to the axes of the members and disposed at the same angle relative to the tangent of the member at the intersection of the member and said surface, one drive element in the form of a cylindrical roller being disposed in each of the indentations.

3. A one-way brake assembly comprising the combination of claim 1 in combination with means operatively associated with the outer member for anchoring the outer member against rotation.

4. An automatic backstop comprising a one-way brake assembly having an inner member with a generally cylindrical exterior surface forming an inner race and having ends disposed normal to the axis of the race, said inner member having an opening extending therethrough on the axis of the inner race adapted to receive and be anchored on a shaft, said inner race having a plurality of indenations extending therein, each indentation having a flat surface disposed parallel to the axis of the inner race and at a common angle to the tangent to the inner race at the intersection of the flat surface and the inner race, an outer member having a cylindrical opening therein forming an outer race, a pair of parallel spaced circular bearing assemblies mounted coaxially about the inner race and coaxially within the outer race for rotatably mounting of the outer race on the inner race, a plurality of cylindrical rollers of the same diameter, one of said rollers being disposed in each of the indentations of the inner race, said rollers wedging between the inner and outer races for rotational torque applied between the inner and outer members in one direction and rotating freely between the inner and outer races for rotational torque applied between the inner and outer members in the opposite direction, said outer member having an axial length greater than the inner member and a lip on each end thereof extending inwardly therefrom about the opening therein, each of said lips confronting one end of the inner member, a first and a second sealing ring disposed coaxially with the races at opposite ends of the inner member, each of said sealing rings being disposed between one of the lips and the confronting end of the inner member to form a fluid tight seal, a third and a fourth sealing ring disposed coaxially about the inner member on opposite sides of the pair of bearing assemblies, said third and fourth sealing rings forming fluid tight seals between the inner and outer members, a first liquid lubricant disposed within the outer member in the region disposed between the third and fourth sealing rings, a body of grease disposed within the outer member between the first sealing ring and the adjacent sealing ring, and a second body of grease disposed between the inner and outer races between the second sealing ring and the adjacent sealing ring, and means operatively associated with the outer member for anchoring the outer member against rotation relative to a support structure.

5. A one-way backstop comprising the combination of claim 4 wherein the first and second sealing rings comprise a packing of asbestos impregnated with graphite.

6. A one-way backstop comprising the elements of claim 4 wherein the third and fourth sealing rings comprise lip rings wherein the lips extend from the side of the ring remote from the ends of the inner race.

7. A one-way backstop comprising the combination of claim 4 wherein the outer member is provided with a channel extending from the region between the inner and outer races and disposed below the axis of the inner and outer races, in combination with removable means mounted in said channel for sealing said channel.

8. An automatic backstop comprising the combination of claim 7 wherein the outer race is provided with a second channel communicating with the region between the inner and outer races, said second channel being disposed above the axes of the races, in combination with a pressure relief valve sealed within said second channel.

9. An automatic backstop comprising the combination of claim 8 wherein the outer member is provided with a third and a fourth channel disposed substantially on opposite sides of the outer member and extending to the region between the inner and outer members on the side of one of the sealing rings remote from the inner and outer race, one of said channels being sealed by a pressure gun grease fitting and the other of said channels being closed by a pressure relief valve.

10. A one-way brake assembly comprising an inner member having a generally cylindrical surface forming an inner race, said inner member being adapted to be mechanically coupled to a shaft disposed on the axis thereof, and an outer member having a cylindrical opening therein forming an outer race, means for rotatably mounting the outer member coaxially about the inner member with the outer race confronting and spaced from the inner race, a plurality of drive elements disposed between the inner race and outer race, rotational torque applied between the inner and outer members in one direction wedging the drive elements between the races and torque in the other direction releasing the drive elements to permit rotation of the inner and outer members relative to each other, a first and a second sealing ring disposed coaxially with the races at opposite ends of the inner member, the first of said sealing rings being disposed between one end of the outer member and the confronting end of the inner member to form a fluid tight seal and the second of said sealing rings being disposed between the other end of the outer member and the confronting end of the inner member to form a fluid tight seal therebetween, a third and a fourth sealing ring disposed coaxially about the inner member on opposite sides of the drive elements, said third sealing ring forming a fluid tight seal between the first sealing ring and the drive elements and the fourth sealing ring forming a fluid tight seal between the second sealing ring and the drive elements, means for introducing a first lubricant between the third and fourth sealing rings, means for introducing a second lubricant between the first and third sealing rings, and means for introducing said second lubricant between the second and fourth sealing rings.

No references cited.

MILTON BUCHLER, *Primary Examiner.*